United States Patent
Okochi et al.

(10) Patent No.: US 7,252,442 B2
(45) Date of Patent: Aug. 7, 2007

(54) TAPE PRINTER AND CONTROL METHOD OF TAPE PRINTER

(75) Inventors: Hajime Okochi, Inazawa (JP); Yuichiro Suzuki, Okazaki (JP); Jun Itakura, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 259 days.

(21) Appl. No.: 11/013,726

(22) Filed: Dec. 17, 2004

(65) Prior Publication Data

US 2005/0163551 A1 Jul. 28, 2005

(30) Foreign Application Priority Data

Jan. 28, 2004 (JP) ............................. 2004-019827

(51) Int. Cl.
 *B41J 3/46* (2006.01)
 *G06F 3/14* (2006.01)
 *G06F 3/147* (2006.01)
 *G06F 3/12* (2006.01)
(52) U.S. Cl. ..................... 400/76; 400/83; 345/684
(58) Field of Classification Search ............ None
 See application file for complete search history.

(56) References Cited

U.S. PATENT DOCUMENTS

| 4,686,649 A | * | 8/1987 | Rush et al. | .................. 715/517 |
| 5,494,360 A | * | 2/1996 | Watanabe et al. | ............. 400/83 |
| 2003/0110441 A1 | * | 6/2003 | Tsukuda et al. | ............ 715/500 |

FOREIGN PATENT DOCUMENTS

| EP | 0 656 595 A2 | 6/1995 |
| EP | 0 855 282 A2 | 7/1998 |
| JP | A 06-199002 | 7/1994 |
| JP | 06227052 A | * | 8/1994 |

OTHER PUBLICATIONS

Machine translation of JP 06227052 to Koakutsu from Japanese Patent Office website.*

* cited by examiner

Primary Examiner—Daniel J. Colilla
(74) Attorney, Agent, or Firm—Oliff & Berridge, PLC

(57) ABSTRACT

A tape printer prints a text on a print label in such a way that the right side position of a character "A" corresponding to the beginning data of the text is moved to the final position of a liquid crystal display, and then an image of a leading end of the print label is displayed on the liquid crystal display as an initial display state.

43 Claims, 15 Drawing Sheets

FIG. 13

| TAPE WIDTH | PRINT HEIGHT | REDUCTION RATE ||
|---|---|---|---|
| | | IMAGE DISPLAY LARGE (DISPLAY HEIGHT 40 DOTS) | IMAGE DISPLAY SMALL (DISPLAY HEIGHT 20 DOTS) |
| 24mm | 128 | 31% | 16% |
| 18mm | 112 | 36% | 18% |
| 12mm | 70 | 57% | 29% |
| 9mm | 56 | 71% | 36% |
| 6mm | 32 | 125% | 63% |

TAPE PRINTER AND CONTROL METHOD OF TAPE PRINTER

BACKGROUND OF THE INVENTION

1. Field of the Invention

The present invention relates to a tape printer and control method of tape printer for displaying an image of part of a print label produced by cutting off a printed print tape.

2. Description of the Related Art

In a conventional tape printer, a text of document data such as characters entered and created from a keyboard or the like is printed on a print tape, and the tape is cut off to produce a print label, and it may also include an image display function for displaying the image of the print label on a display screen.

By this image display function, before printing the text, the size and position of the characters and the like in the print label produced after printing can be checked, and the print label according to the intent of the user can be easily produced, and useless consumption of print tape can be prevented (for example, see Japanese patent publication laid-open No. H6-199002 (1994-199002)).

In this image display function, however, since the default is set so as to display the image from the leading end of the print label to be produced later, if a large blank is set at the leading end of the print label or many spaces are inserted at the beginning of the text to be printed, only the image of the leading end blank of the print label or blank and spaces may be displayed as initial display state. Observing this initial display state, the user may not judge immediately which portion of image of the print label is displayed or may misunderstand that character data is not entered.

In such a case, by scroll display from the initial display state of the image display, the image display range of print label can be moved, and the size and position of characters to be produced later on the print label can be confirmed. However, if large blanks are set at both ends of the print label, or many spaces are inserted at the beginning or end of the text to be printed, if the image of characters and the like of the print label is displayed, the image of the beginning and end of print label is not displayed, the user observing this image display may find it difficult to judge which part of the image of the print label is being displayed.

SUMMARY OF THE INVENTION

The present invention has been made in view of the above circumstances and has an object to overcome the above problems and to provide a tape printer and control method of tape printer capable of displaying an image easy to understand for users.

To achieve the purpose of the invention, there is provided a tape printer comprising a text creating device that creates a text composed of document data such as characters, a printing device that prints the text on a lengthy print tape in a state of having a forward blank positioned ahead of the text, a cutting device that cuts off the print tape having the text printed by the printing device in a state of having the forward blank and a backward blank positioned behind the text, thereby producing a print label, and an image display device that displays an image of the print label, further comprising: a control device that controls the tape printer, wherein the control device displays an image of a leading end portion of the print label on the image display device by disposing an image of beginning data of the text in a final position of the image display device.

According to the tape printer of the invention, in the image display device that displays an image of a print label, since the image of the leading end portion of the print label is displayed in a state of the image of the beginning data of the text to be printed on the print label being disposed at a final position of the image display device, if a large blank is set at the leading end of the print label, it is possible to avoid displaying the image of blank only at the leading end portion of the print label as initial display state. Therefore, in the initial display state of the image display device, characters and the like corresponding to the beginning data of the text to be printed on the print label can be always displayed, and the image display range of the print label can be instantly known, so that the image easy to understand for the user can be displayed.

According to another aspect, the present invention provides a tape printer comprising a text creating device that creates a text composed of document data such as characters, a printing device that prints the text on a lengthy print tape in a state of having a forward blank positioned ahead of the text, a cutting device that cuts off the print tape having the text printed by the printing device in a state of having the forward blank and a backward blank positioned behind the text, thereby producing a print label, and an image display device that displays an image of the print label, further comprising: a control device that controls the tape printer; and a lengthy display region held in part of the image display device to represent an overall contour of the print label, wherein the control device displays a display range of the print label in the image display device in the display region in a relative regional relation with the overall contour of the print label.

According to the above tape printer of the invention, in the image display device that displays an image of a print label, in a lengthy display region held for showing an entire contour of this print label, the display range of this print label is displayed solid in a relative regional relation with the entire contour of the print label. Therefore, if only the blank or space of the print label is displayed in image, the image display range of the print label can be instantly known through the solid display area in the lengthy display region, so that the image easy to understand for the user can be displayed.

Further, according to another aspect, the present invention provides a tape printer comprising a text creating device that creates a text composed of document data such as characters, a printing device that prints the text on a lengthy print tape in a state of having a forward blank positioned ahead of the text, a cutting device that cuts off the print tape having the text printed by the printing device in a state of having the forward blank and a backward blank positioned behind the text, thereby producing a print label, and an image display device that displays an image of the print label, further comprising: a control device that controls the tape printer; and a lengthy display region held in part of the image display device to represent an overall contour of the print label, wherein the control device displays an image of a leading end portion of the print label on the image display device by disposing an image of beginning data of the text in a final position of the image display device, and the control device also displays a display range of the print label in the image display device in a display region in a relative regional relation with an overall contour of the print label.

According to the tape printer of the invention, in the image display device that displays an image of a print label, since the image of the leading end portion of the print label is displayed in a state of the image of the beginning data of the text to be printed on the print label being disposed at a final position of the image display device, if a large blank is set at the leading end of the print label, it is possible to avoid displaying the image of blank only at the leading end portion of the print label as initial display state. Therefore, in the initial display state of the image display device, characters and the like corresponding to the beginning data of the text to be printed on the print label can be always displayed, and the image display range of the print label can be instantly known, so that the image easy to understand for the user can be displayed.

Further, according to the tape printer of the invention, in image display device that displays an image of a print label, in a lengthy display region held for showing an entire contour of this print label, the display range of this print label is displayed solid in a relative regional relation with the entire contour of the print label. Therefore, if only the blank or space of the print label is displayed in image, the image display region of the print label can be instantly known through the solid display area in the lengthy display region, so that the image easy to understand for the user can be displayed.

Further, according to another aspect, the present invention provides a control method of a tape printer comprising a text creating step of creating a text composed of document data such as characters, a printing step of printing the text on a lengthy print tape in a state of having a forward blank positioned ahead of the text, a cutting step of cutting off the print tape having the text printed at the printing step in a state of having the forward blank and a backward blank positioned behind the text, thereby producing a print label, and an image display step of displaying an image of the print label on an image display means, further comprising: a first display control step of displaying an image of a leading end portion of the print label on the image display means by disposing an image of beginning data of the text in a final position of the image display means.

According to the control method of tape printer of the invention, in image display means for displaying an image of a print label, since the image of the leading end portion of the print label is displayed in a state of the image of the beginning data of the text to be printed on the print label being disposed at a final position of the image display means, if a large blank is set at the leading end of the print label, it is possible to avoid displaying the image of blank only at the leading end portion of the print label as initial display state. Therefore, in the initial display state of the image display means, characters and the like corresponding to the beginning data of the text to be printed on the print label can be always displayed, and the image display range of the print label can be instantly known, so that the image easy to understand for the user can be displayed.

Further, according to another aspect, the present invention provides a control method of a tape printer comprising a text creating step of creating a text composed of document data such as characters, a printing step of printing the text on a lengthy print tape in a state of having a forward blank positioned ahead of the text, a cutting step of cutting off the print tape having the text printed at the printing step in a state of having the forward blank and a backward blank positioned behind the text, thereby producing a print label, and an image display step of displaying an image of the print label on an image display means, further comprising: a second display control step of displaying a display range of the print label in the image display means in a relative regional relation with an overall contour of the print label, in a lengthy display region held in part of the image display means to represent the overall contour of the print label.

According to the control method of tape printer of the invention, in image display means for displaying an image of a print label, in a lengthy display region held for showing an entire contour of this print label, the display range of this print label is displayed solid in a relative regional relation with the entire contour of the print label. Therefore, if only the blank or space of the print label is displayed in image, the image display range of the print label can be instantly known through the solid display area in the lengthy display region, so that the image easy to understand for the user can be displayed.

Further, according to another aspect, the present invention provides a control method of a tape printer comprising a text creating step of creating a text composed of document data such as characters, a printing step of printing the text on a lengthy print tape in a state of having a forward blank positioned ahead of the text, a cutting step of cutting off the print tape having the text printed at the printing step in a state of having the forward blank and a backward blank positioned behind the text, thereby producing a print label, and an image display step of displaying an image of the print label on an image display means, further comprising: a first display control step of displaying an image of a leading end portion of the print label on the image display means by disposing an image of beginning data of the text in a final position of the image display means; and a second display control step of displaying a display range of the print label in the image display means in a relative regional relation with an overall contour of the print label, in a lengthy display region held in part of the image display means to represent the overall contour of the print label.

According to the control method of tape printer of the invention, in image display means for displaying an image of a print label, since the image of the leading end portion of the print label is displayed in a state of the image of the beginning data of the text to be printed on the print label being disposed at a final position of the image display means, if a large blank is set at the leading end of the print label, it is possible to avoid displaying the image of blank only at the leading end portion of the print label as initial display state. Therefore, in the initial display state of the image display means, characters and the like corresponding to the beginning data of the text to be printed on the print label can be always displayed, and the image display range of the print label can be instantly known, so that the image display easy to understand for the user can be displayed.

Further, according to the control method of tape printer of the invention, in image display means for displaying an image of a print label, in a lengthy display region held for showing an entire contour of this print label, the display range of this print label is displayed solid in a relative regional relation with the entire contour of the print label. Therefore, if only the blank or space of the print label is displayed in image, the image display range of the print label can be instantly known through the solid display area in the lengthy display region, so that the image easy to understand for the user can be displayed.

According to another aspect of the invention, a tape printer comprising text creating means for creating a text composed of document data such as characters, printing means for printing the text on a lengthy print tape in a state of having a forward blank positioned ahead of the text, cutting means for cutting off the print tape having the text printed by the printing means in a state of having the forward blank and a backward blank positioned behind the text, thereby producing a print label, and image display means for displaying an image of the print label, further comprising: first display control means for displaying an image of a leading end portion of the print label on the image display means by disposing an image of beginning data of the text in a final position of the image display means.

According to the tape printer of the invention, in image display means for displaying an image of a print label, since the image of the leading end portion of the print label is displayed in a state of the image of the beginning data of the text to be printed on the print label being disposed at a final position of the image display means, if a large blank is set at the leading end of the print label, it is possible to avoid displaying the image of blank only at the leading end portion of the print label as initial display state. Therefore, in the initial display state of the image display means, characters and the like corresponding to the beginning data of the text to be printed on the print label can be always displayed, and the image display range of the print label can be instantly known, so that the image easy to understand for the user can be displayed.

According to another aspect of the invention, a tape printer comprising text creating means for creating a text composed of document data such as characters, printing means for printing the text on a lengthy print tape in a state of having a forward blank positioned ahead of the text, cutting means for cutting off the print tape having the text printed by the printing means in a state of having the forward blank and a backward blank positioned behind the text, thereby producing a print label, and image display means for displaying an image of the print label, further comprising: a lengthy display region held in part of the image display means to represent an overall contour of the print label; and second display control means for displaying a display range of the print label in the image display means in a display region in a relative regional relation with the overall contour of the print label.

According to the above tape printer of the invention, in image display means for displaying an image of a print label, in a lengthy display region held for showing an entire contour of this print label, the display range of this print label is displayed solid in a relative regional relation with the entire contour of the print label. Therefore, if only the blank or space of the print label is displayed in image, the image display range of the print label can be instantly known through the solid display area in the lengthy display region, so that the image easy to understand for the user can be displayed.

According to another aspect of the invention, a tape printer comprising text creating means for creating a text composed of document data such as characters, printing means for printing the text on a lengthy print tape in a state of having a forward blank positioned ahead of the text, cutting means for cutting off the print tape having the text printed by the printing means in a state of having the forward blank and a backward blank positioned behind the text, thereby producing a print label, and image display means for displaying an image of the print label, further comprising: first display control means for displaying an image of a leading end portion of the print label on the image display means by disposing an image of beginning data of the text in a final position of the image display means; a lengthy display region held in part of the image display means to represent an overall contour of the print label; and second display control means for displaying a display range of the print label in the image display means in a display region in a relative regional relation with the overall contour of the print label.

According to the tape printer of the invention, in the image display means for displaying an image of a print label, since the image of the leading end portion of the print label is displayed in a state of the image of the beginning data of the text to be printed on the print label being disposed at a final position of the image display means, if a large blank is set at the leading end of the print label, it is possible to avoid displaying the image of blank only at the leading end portion of the print label as initial display state. Therefore, in the initial display state of the image display means, characters and the like corresponding to the beginning data of the text to be printed on the print label can be always displayed, and the image display range of the print label can be instantly known, so that the image easy to understand for the user can be displayed.

Further, according to the tape printer of the invention, in image display means for displaying an image of a print label, in a lengthy display region held for showing an entire contour of this print label, the display range of this print label is displayed solid in a relative regional relation with the entire contour of the print label. Therefore, if only the blank or space of the print label is displayed in image, the image display region of the print label can be instantly known through the solid display area in the lengthy display region, so that the image easy to understand for the user can be displayed.

BRIEF DESCRIPTION OF THE DRAWINGS

FIG. 13 is a diagram showing a table used when determining the reduction rate of image display in the image display process;

DETAILED DESCRIPTION OF THE PREFERRED EMBODIMENTS

A detailed description of preferred embodiments of the present invention will now be given referring to the accompanying drawings.

Figure 19:
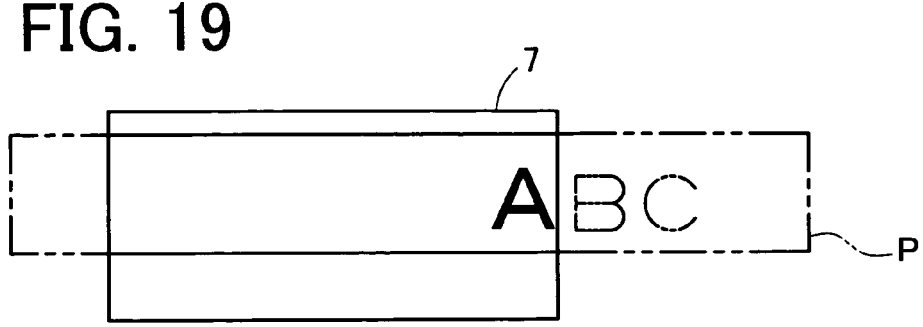
FIG. 19 is a conceptual diagram of relative positional relation of a print label of image display on the liquid crystal display, showing an example of an initial display state of the image display of the print label on the liquid crystal display.

First of all, principal functions of a tape printer in a preferred embodiment of the invention are described. In the tape printer of the preferred embodiment, for example, if desired to produce a print label P printing text content of ABC as shown in FIG. 19, the image of this print label P can be displayed on a liquid crystal display 7, but in the initial display state of the image display, as shown in the diagram, the letter A corresponding to the beginning data of the text is displayed in a final position of the liquid crystal display 7.

In the tape printer of the preferred embodiment, it can be set whether or not to include space data as beginning data of the text. For the convenience of explanation, supposing the space to be □, if the text content is □ABC, when desired to set by including the space data, the space □ corresponding to the beginning data of the text comes to the final position of the liquid crystal display 7, and the letters ABC are not displayed in the initial display state of image display on the liquid crystal display 7. On the other hand, when set not to include the space, the initial display state of image display on the liquid crystal display 7 is the same as shown in FIG. 19, and letter A comes to the final position of the liquid crystal display 7.

Figure 20:
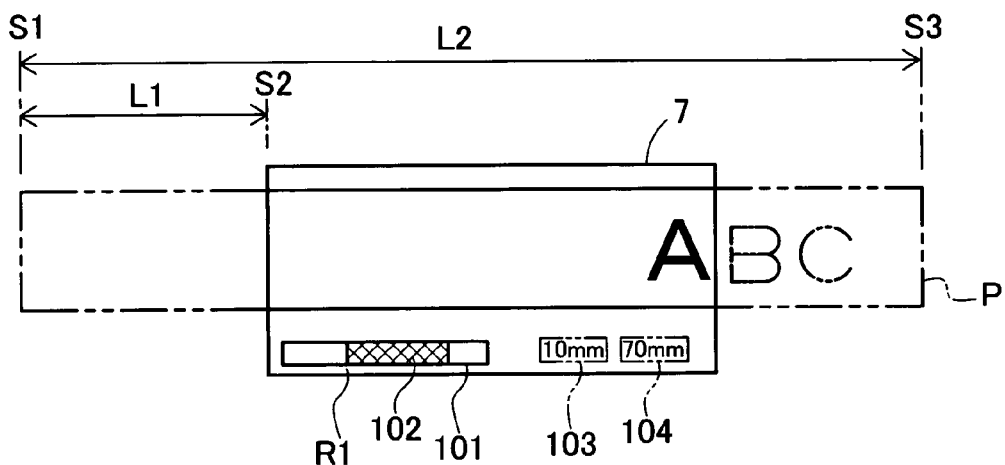
FIG. 20 is a conceptual diagram of relative positional relation of a print label of image display on the liquid crystal display, showing an example of an initial display state of the image display of the print label on the liquid crystal display.

Further, as shown in FIG. 20, a lengthy ruler 101 corresponding to an entire contour of the print label P is provided beneath the liquid crystal display 7. Inside the lengthy ruler 101, there is a solid display region 102 by hatching, and this solid display region 102 indicates the range of image display of the print label P on the liquid crystal display 7 in a relative positional relation with the lengthy ruler 101. Therefore, when the image display range on the liquid crystal display 7 is displayed in scroll at the right side, the solid display region 102 in the lengthy ruler 101 is moved to the right side according to the scroll display to the right side, and when the image display range on the liquid crystal display 7 is displayed in scroll at the left side, the solid display region 102 in the lengthy ruler 101 is moved to the left side according to the scroll display to the left side. Therefore, in the liquid crystal display 7, the range of print label P presently displayed in image can be clarified.

Also in FIG. 20, at the right end of the lengthy ruler 101, there is a first display region 103 which indicates distance L1 from the leading end S1 of print label P to the display start position S2 of print label P in the unit of millimeters. Therefore, when the image display range on the liquid crystal display 7 is displayed in scroll to the right side, according to the scroll display to the right side, the numerical value displayed in the unit of millimeters in the first display region 103 increases, and when the image display range on the liquid crystal display 7 is displayed in scroll to the left side, according to the scroll display to the left side, the numerical value displayed in the unit of millimeters in the first display region 103 decreases.

Further as shown in FIG. 20, at the right side of the first display region 103, there is a second display region 104 which indicates distance L2 from the leading end S1 to the final end S3 of the print label P, that is, the overall length of the print label P, in the unit of millimeters.

In FIG. 20, reference numeral R1 indicates the start position of solid display region 102 in the lengthy ruler 101, and it is described in detail below.

In the tape printer of the preferred embodiment, hatching display can be selected in the blank portion of print label P displayed in image in the liquid crystal display 7, and by selecting it, the blank portion of the print label P can be clearly displayed. Therefore, in the initial display state of image display shown in FIG. 19, for example, when this selection is executed, the display state is changed to FIG. 21, and out of the forward blank positioned before the text ABC, an image display portion 105 on the liquid crystal display 7 is displayed by hatching.

Afterwards, if the image display range on the liquid crystal display 7 is displayed in scroll to the right or left, as long as the forward blank is displayed in image on the liquid crystal display 7, all or part of the forward blank is indicted by hatching. This is the same if a blank portion is positioned behind the text.

The structure and operation for realizing these techniques are explained below.

Figure 1:
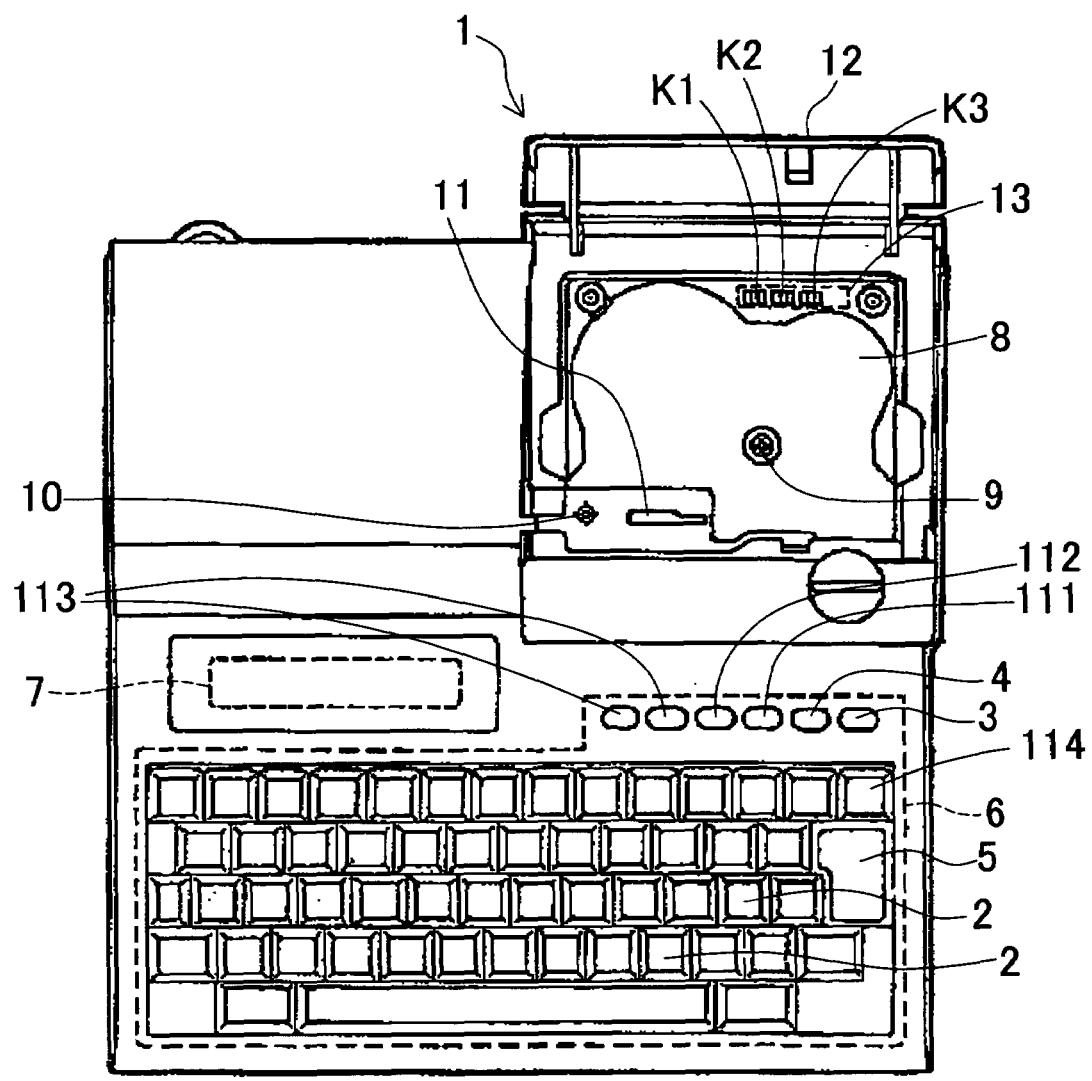
FIG. 1 is a plan view of a tape printer shown by opening a pivoting cover of a tape cassette compartment.

FIG. 1 is a plan view of tape printer shown by opening a pivoting cover of a tape cassette compartment. In FIG. 1, the tape printer 1 comprises a keyboard 6 including text input keys 2 for entering characters and the like, a print key 3, a blank setting key 4, a return key 5 for feeding line and commanding execution of each process, an image display setting key 111, an image display key 112, two scroll keys 113, an image display end key 114, and other function keys, a liquid crystal display 7 for displaying the characters and the like entered from the keyboard 6, and a cassette compartment 8 for accommodating a tape cassette 30 described below.

The cassette compartment 8 incorporates a ribbon take-up shaft 9 which is rotated and driven by a pulse motor 75 described later, and takes up a thermal ink ribbon 34 by turning a ribbon take-up spool 38 of tape cassette 30, and also a tape feed roller shaft 10, which is planted obliquely ahead thereof (keyboard 6 side), for rotating a tape feed roller 43 described below, as being rotated and driven by way of a proper transmission mechanism from the pulse motor 75. Further ahead of the cassette compartment 8, a thermal head 11 is affixed for printing on a film tape 32 described below by way of the thermal ink ribbon 34.

The cassette compartment 8 is opened or closed by the pivoting cover 12 rotatably installed behind the tape printer 1, and the tape cassette 30 is exchanged in open state.

Figure 2:
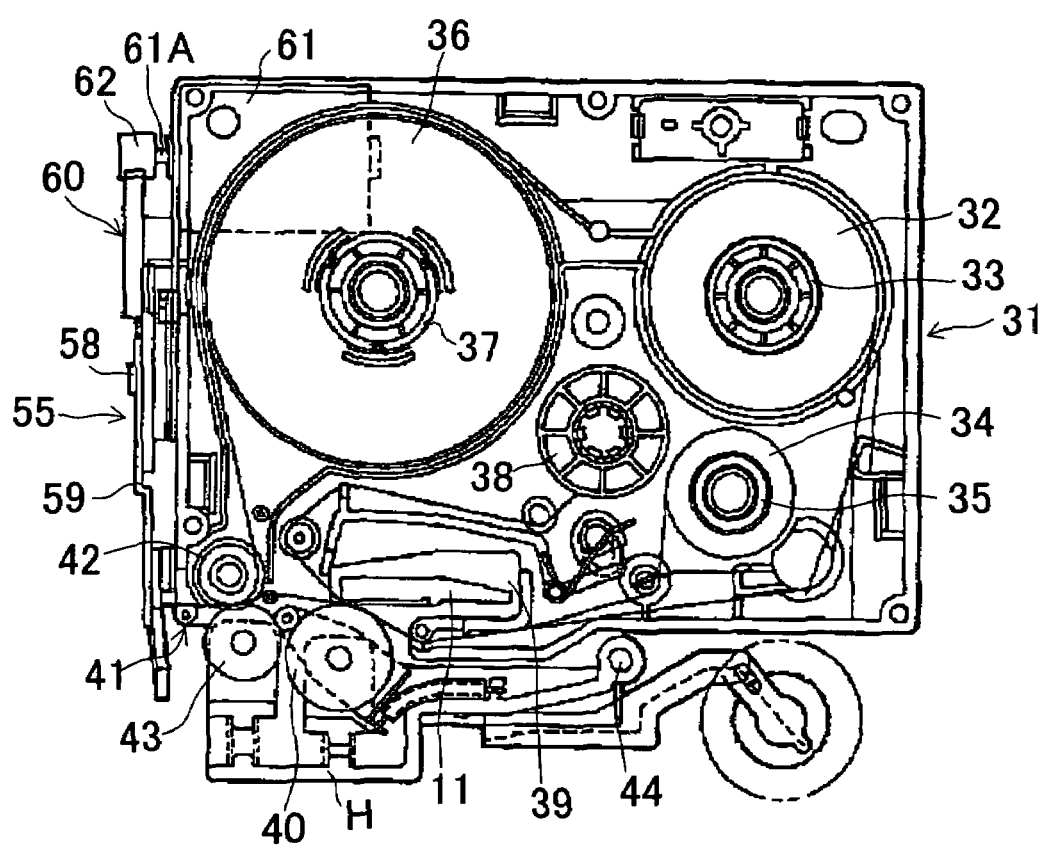
FIG. 2 is a plan view showing a state of a tape cassette accommodated in the cassette compartment.
Figure 3:
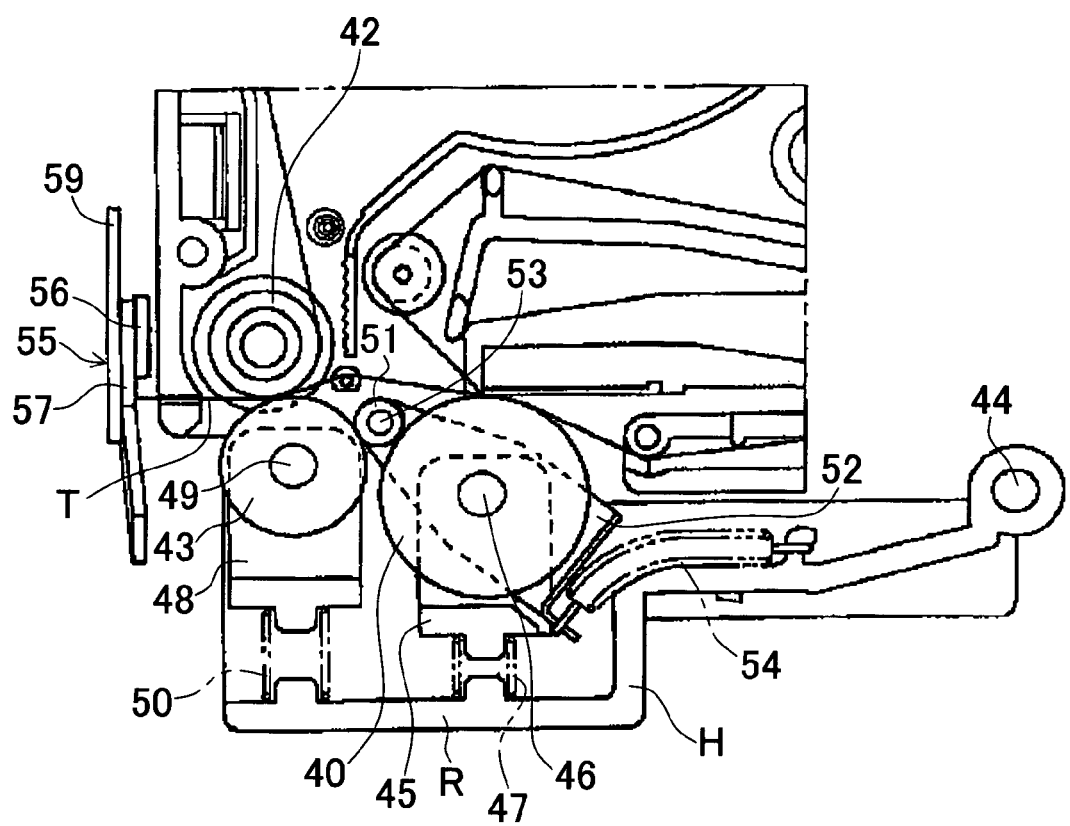
FIG. 3 is a partly magnified plan view showing a state of the tape cassette accommodated in the cassette compartment.

The structure of the tape cassette 30 is explained by referring to FIG. 2 and FIG. 3. FIG. 2 is a plan view showing a state of the tape cassette 30 accommodated in the cassette compartment 8 (shown by removing an upper case of the tape cassette 8), and FIG. 3 is its partly magnified plan view.

In these drawings, a lower case 31 comprises a tape spool 33 with a wound transparent film tape 32, a ribbon spool 35 with a wound thermal ink ribbon 34, and an adhesive tape spool 37 having a double side adhesive tape 36 with parting paper wound with the parting paper side outside, and these spools 33, 35, 37 are rotatably supported by cooperation with support units provided in the lower side of the upper case not shown.

Among these spools 33, 35, 37, a ribbon take-up spool 38 is similarly supported rotatably, and the ribbon take-up spool 38 is engaged with the ribbon take-up shaft 9, and takes up the thermal ink ribbon 34 used by printing by driving of the ribbon take-up shaft 9.

Further, the thermal head 11 is disposed in a recess 39 provided in the lower case 31, and a platen roller 40 rotatably supported by a roller holder H described later is disposed opposite to the thermal head 11 in pressing contact state. The thermal head 11 has multiple heating elements (128 heating elements in the thermal head 11 of the preferred embodiment), and is designed to print characters and the like on the film tape 32 by way of the thermal ink ribbon 34.

Near a tape discharge section 41 of the lower case 31 (the lower left side in FIG. 1 and FIG. 2), a tape pressing roller 42 is rotatably supported, and a tape feed roller 43 rotatably supported by the roller holder H described later is disposed opposite to the tape pressing roller 42 in pressing contact state.

In the cassette compartment 8, ahead of the tape cassette 30 (lower side in FIG. 1 and FIG. 2), the roller holder H is pivoted rotatably by a support shaft 44, and this roller holder H is changed over between print position and release position by manual changeover mechanism not shown (print position is shown in FIG. 1 and FIG. 2).

The roller holder H rotatably supports the platen roller 40 and tape feed roller 43 as shown in FIG. 3, and is disposed tightly to the thermal head 11 and pressing roller 42.

That is, the platen roller 40 is supported rotatably about a rotary shaft 46 planted on a holder member 45, and the holder member 45 is pressed to the thermal head 11 by means of an elastic spring 47 loaded between it and the rear wall R of the roller holder H.

Further, the tape feed roller 43 is supported rotatably about a rotary shaft 49 planted on a holder member 48, and the holder member 48 is pressed to the pressing roller 42 by means of an elastic spring 50 loaded between it and the rear wall R of the roller holder H. The tape feed roller 43 is rotated and driven by the tape feed roller shaft 10, and at the same time the pressing roller 42 is rotated and driven in cooperation with the tape feed roller 43 by a gear mechanism not shown.

Further, an intermediate roller 51 is supported rotatably on a holder member 52 by way of a rotary shaft 53 so as to contact with both platen roller 40 and tape feed roller 43, and this holder member 52 is rotatable coaxially with the holder member 45 about the rotary shaft 46, and is always forced in the counterclockwise direction in FIG. 2 by the action of a tensile spring 54 loaded between the rear end portion of holder member 52 and roller holder H. As a result, the intermediate roller 51 is contacting with both the platen roller 40 and tape feed roller 43.

Along the feed direction of the film tape 32, a cutter mechanism 55 is disposed near the tape discharge section 41 at the downstream side of the thermal head 11. The cutter mechanism 55 is similar to known scissors in structure, consisting of a fixed blade 56 and a movable blade 57. The movable blade 57 is affixed on a turning lever 59 turning about a pivot 58, and the turning lever 59 is coupled to a pinion 62 affixed on a drive shaft 61A of a DC motor 61 by way of a gear mechanism 60.

Accordingly, the movable blade 57 is opened or closed about the pivot 58 by way of pinion 62, gear mechanism 60, and turning lever 59 along with normal and reverse rotation of the drive shaft 61A of the DC motor 61, and cuts off the produced print tape T in cooperation with the fixed blade 56 in the opening and closing action.

The pressing roller 42 and tape feed roller 43 cooperate, and press the adhesive surface of the double side adhesive tape 36 against the film tape 32 on which characters and the like is printed by way of the thermal ink ribbon 34 by the thermal head 11, thereby producing the print tape T finally.

Further, behind the cassette compartment 8, a tape width detector 13 is disposed for detecting the tape width of various tapes (each tape having a same tape width in one tape cassette 30) for producing the print tape T accommodated in the tape cassette 30.

The tape width detector 13 comprises three photo couplers K1, K2, K3, and discriminating members (not shown) provided on the back of the tape cassette 30 are inserted in these photo couplers K1, K2, K3 when the tape cassette 30 is mounted in the cassette compartment 8, and the discriminating members selectively shield the photo couplers K1, K2, K3, so that the tape width of each tape of producing the print tape T accommodated in the tape cassette 30 can be detected.

Herein, there are five types of tape width, 24 mm, 18 mm, 12 mm, 9 mm, and 6 mm (see FIG. 13), and photo couplers P1, P2, P3 are intended to detect the tape width in the tape cassette 30 by combination of H signal and L signal issued on the basis of selective shielding by the discriminating members. The structure of the tape width detector 13 is same as disclosed in Japanese patent publication laid-open No. H3-217860 (1991-217860) and Japanese patent publication laid-open No. H3-217861 (1991-217861), and detailed description is omitted herein.

Figure 4:
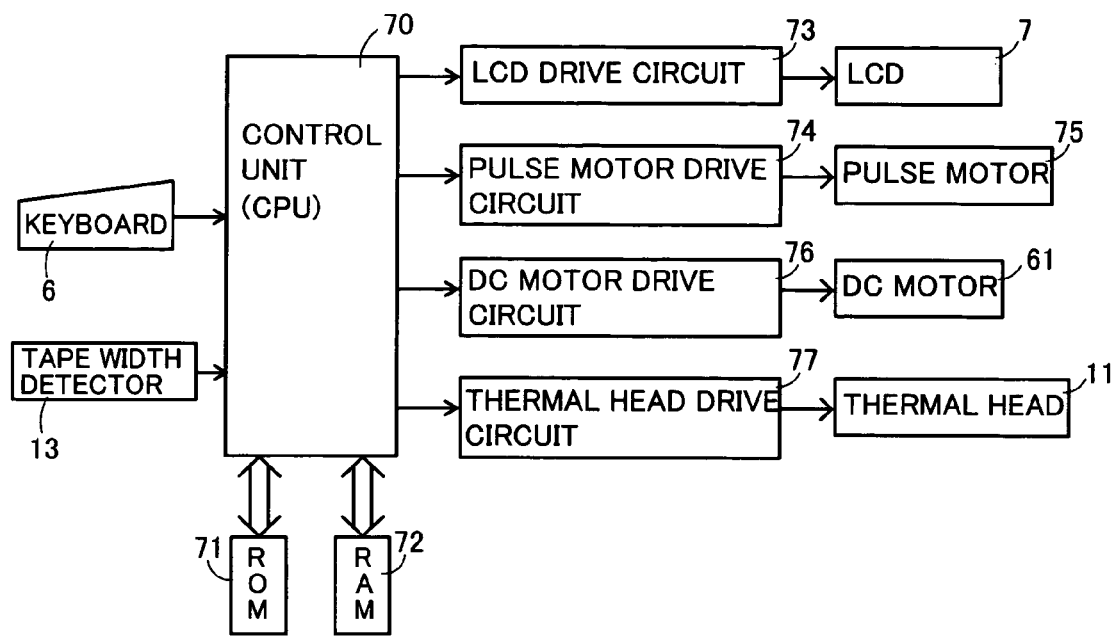
FIG. 4 is a block diagram showing a control system of the tape printer.

A control system of tape printer is explained by referring to FIG. 4. FIG. 4 is a block diagram of the tape printer, in which a control unit (hereinafter called CPU) 70 is a central component. In FIG. 4, the keyboard 6 is connected to the CPU 70, and the CPU 70 distinguishes text input signals entered from the text input keys 2 of the keyboard 6, and various input signals entered from keys such as print key 3, blank setting key 4, return key 5, image display setting key 111, image display key 112, scroll keys 113, image display end key 114, and others. It also judges the H signal and L signal issued from the tape width detector 13.

A ROM 71 is also connected to the CPU 70. The ROM 71 stores, as described later, main control program, blank setting process program, image display setting process program, image display process program, CGROM for generating dot pattern data on the basis of code data corresponding to the characters and the like entered from the text input keys 2 of the keyboard 6, and other various programs necessary for control of the tape printer.

Further, a RAM 72 connected to the CPU 70 is for temporarily storing various data, and includes a text memory for saving the text by sequentially storing the code data corresponding to characters and the like entered from the text input keys 2 of the keyboard 6, a development buffer for storing by developing the code data of the text memory through the CGROM into dot pattern data, a print buffer for transferring the dot pattern data of the development buffer and storing the print data to be printed by the thermal head 11, a display buffer for storing display data to be displayed on the liquid crystal display 7, extra character buffer for storing extra character pattern data, and other memories. The display buffer further includes an image display buffer for storing the image display data to be displayed in image on the liquid crystal display 7, a reduced image display buffer for storing the reduced image display data to be displayed in image by reducing on the liquid crystal display 7, and others.

Still more, the CPU 70 is connected to the liquid crystal display 7 by way of a liquid crystal display drive circuit 73. The CPU 70 drives the liquid crystal display drive circuit 73 on the basis of the display data stored in the display buffer of the RAM 72, and displays the characters and the like entered on the liquid crystal display 7. Further, on the basis of the program stored in the ROM 71, the CPU 70 drives a pulse motor drive circuit 74 to control a pulse motor 75, and thereby controls the feed of print tape T. Similarly, the CPU 70 drives a DC motor drive circuit 76 on the basis of the program stored in the ROM 71, and controls the DC motor 61.

The CPU 70 is also connected to the thermal head 11 by way of a thermal head drive circuit 77, and the CPU 70 drives the thermal head drive circuit 77 on the basis of the print data stored in the print buffer of the RAM 72, and prints the characters and the like on the film tape 32 by means of the thermal head 11.

Figure 5:
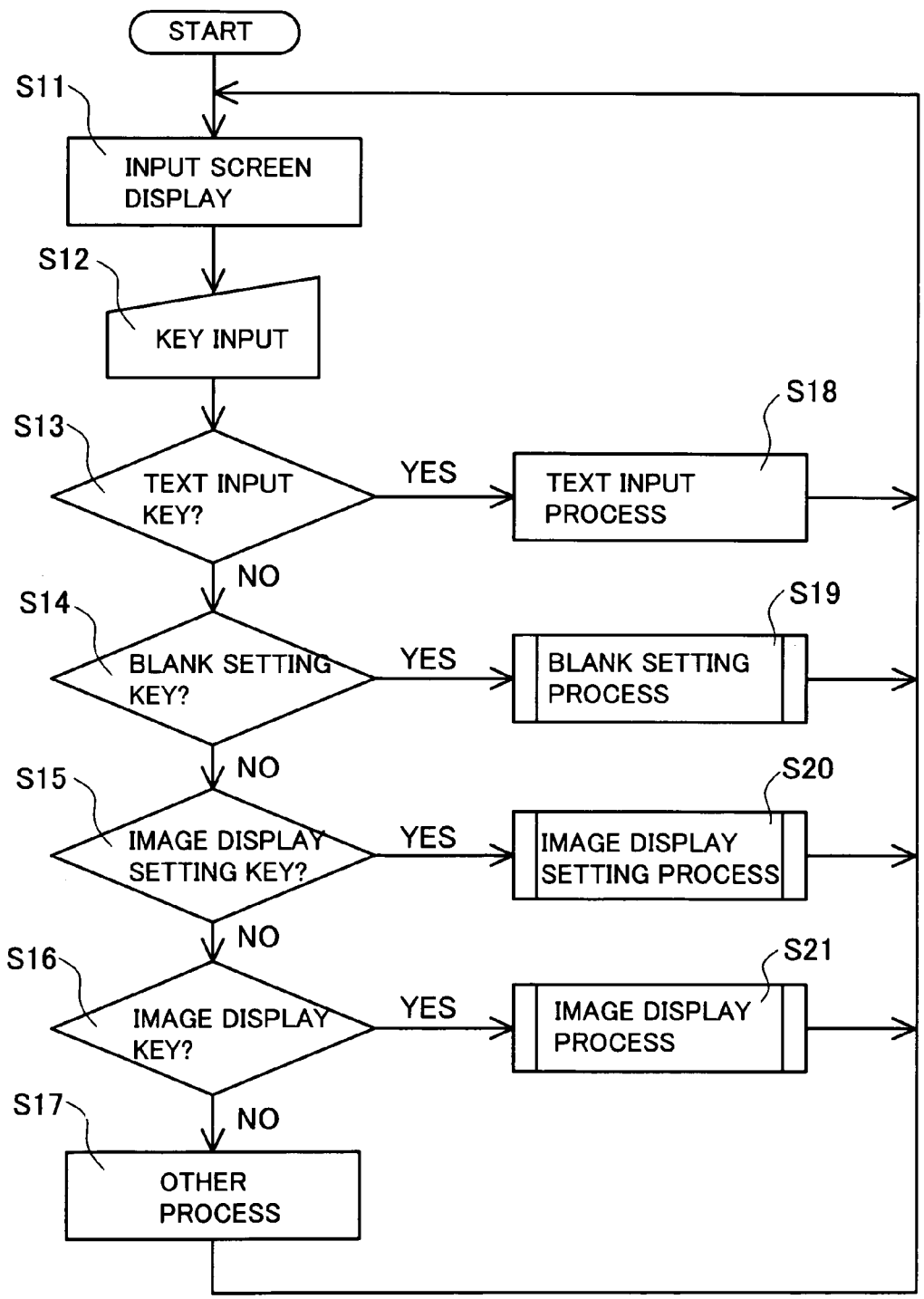
FIG. 5 is a flowchart of a main control program.
Figure 6:
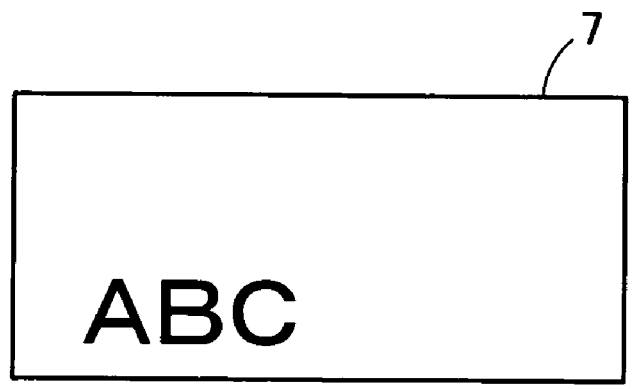
FIG. 6 is a diagram showing an example of an input screen display reflecting a character input process.

In the tape printer 1 having such configuration, the operation is explained by referring to FIG. 5 to FIG. 18. FIG. 5 is a flowchart of a main control program. As shown in FIG. 5, first at step ("S" hereinafter) 11, an input screen is displayed on the liquid crystal display 7. At S12, when any key is entered on the keyboard 6, going to step S13, it is judged whether a text input key 2 is entered or not. When it is judged that a text input key 2 is entered (Yes at S13), going to S18, the text input is processed by using the development buffer stored in the RAM 72, and then returning to S11, the input screen displays the result of text input process. For example, in the case of input of text ABC through text input keys 2, the input screen display on the liquid crystal display 7 is as shown in FIG. 6. On the other hand, if it is judged any text input key 2 is not entered (No at S13), the process goes to S14.

At S14, it is judged whether the blank setting key 4 is entered or not. When it is judged that the blank setting key 4 is entered (Yes at S14), going to S19, the blank setting is processed as described below, and returning to S11, the input screen displays the result of blank setting process. If it is judged that the blank setting key 4 is not entered (No at S14), the process goes to S15.

At S15, it is judged whether the image display setting key 111 is entered or not. At this time, when it is judged that the image display setting key 111 is entered (Yes at S15), going to S20, the image display setting is processed as described below, and returning to S11, the input screen displays the result of image display setting process. On the other hand, if it is judged that the image display setting key 111 is not entered (No at S15), the process goes to S16.

At S16, it is judged whether the image display key 112 is entered or not. At this time, when it is judged that the image display key 112 is entered (Yes at S16), going to S21, the image display is processed as described below, and returning to S11, the input screen displays (image display) the result of image display process. On the other hand, if it is judged that the image display key 112 is not entered (No at S16), the process goes to S17, and other process is done, and the operation returns to S11.

Other process includes, for example, print process to be executed on the occasion of input of print key 3. When the print process is executed, the text is printed on the print tape T on the basis of the content stored in the print buffer stored in the RAM 72, and the print tape T is automatically cut off by cooperation of the fixed blade 56 and movable blade 57, and one print label P is produced.

Figure 7:
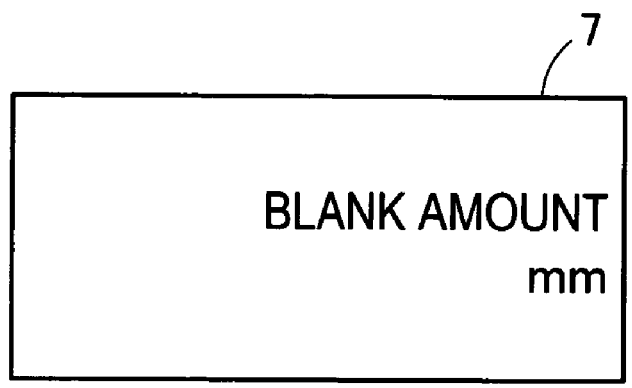
FIG. 7 is a diagram showing display contents of a liquid crystal display when setting a blank amount (margin) in a blank setting process.
Figure 8:
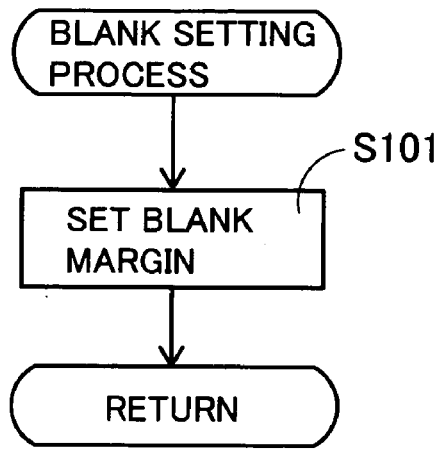
FIG. 8 is a flowchart of a blank setting process program.

Blank setting process at S19 in FIG. 5 is explained. FIG. 8 is a flowchart of a blank setting process program. As mentioned above, at S14 in FIG. 5, when it is judged that the blank setting key 4 is entered (Yes at S14), going to S19 in FIG. 5, the blank setting process in FIG. 8 is executed. That is, at S101, a blank amount (margin) in the print label P is set. More specifically, at S101, as shown in FIG. 7, the liquid crystal display 7 shows "blank amount: mm", and when a numerical value is entered from the keyboard 6, the figure is displayed. For example, when a numerical value of 10 is entered, the liquid crystal display 7 shows "blank amount: 10 mm". Herein, if the blank setting key 4 is entered, the entered numerical value is canceled, and the liquid crystal display 7 shows "blank amount: mm" again, and a numerical value can be newly entered. At S101, when the return key 5 is entered, the setting of blank amount is established, and the blank amount is stored in the RAM 72, and the process resumes the main control program in FIG. 5.

Figure 9:
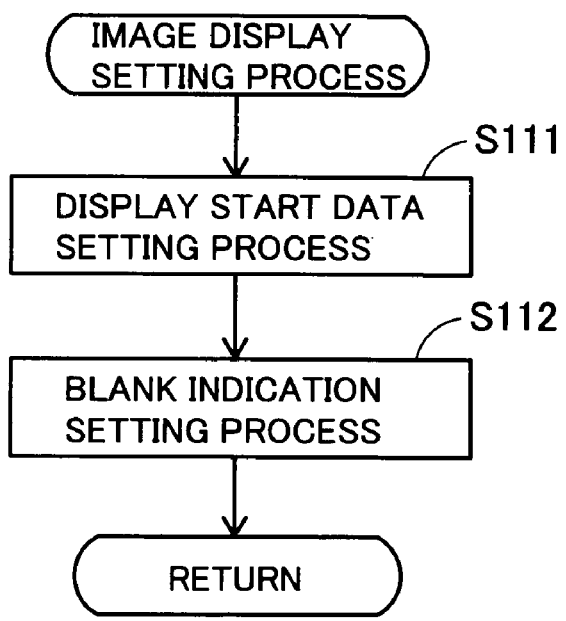
FIG. 9 is a flowchart of image display setting process program.

Image display setting process at S20 in FIG. 5 is explained. FIG. 9 is a flowchart of an image display setting process program. As mentioned above, at S15 in FIG. 5, when it is judged that the image display setting key 111 is entered (Yes at S15), going to S20 in FIG. 5, the image display setting process in FIG. 9 is executed.

Figure 10A:
FIG. 10A is a diagram showing display contents of the liquid crystal display when setting by including space data in the beginning data of text in a display start data setting process.
Figure 10B:
FIG. 10B is a diagram showing display contents of the liquid crystal display when setting without including space data in the beginning data of text in the display start data setting process.

That is, at S111, display start data setting is processed. By this display start data setting process, it is decided whether or not to include space data in the beginning data of the text. More specifically, at S111, as shown in FIG. 10A, the liquid crystal display 7 shows "DISPLAY START DATA SPACE YES", and space data is included in the beginning data of the text. At this time, when the image display setting key 111 is entered, as shown in FIG. 10B, the liquid crystal display 7 shows "DISPLAY START DATA SPACE NO", and space data is not included in the beginning data of the text. When the image display setting key 111 is entered again, as shown in FIG. 10A, the liquid crystal display 7 shows "DISPLAY START DATA SPACE YES", and space data is included in the beginning data of the text. That is, at S111, at every input of image display setting key 111, the state of including space data in the beginning data of the text and the state of not including are changed over alternately. At S111, when the return key 5 is entered, the state of including or not including space data in the beginning data of the text is established, and the established content is stored in the RAM 72, and the process goes to S112.

At S112, blank indication setting is processed. By this blank indication setting process, it is decided whether or not to indicate the blank of the print label P (compare FIG. 18 with FIG. 20). More specifically, at S112, a shown in FIG. 11A, the liquid crystal display 7 shows "BLANK INDICATION ON", and the blank of the print label P is indicated.

Figure 11A:
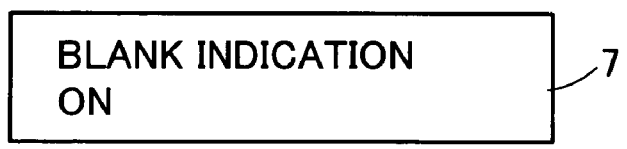
FIG. 11A is a diagram showing display contents of the liquid crystal display when setting by indicating blank of a print label P in a blank indication setting process.
Figure 11B:
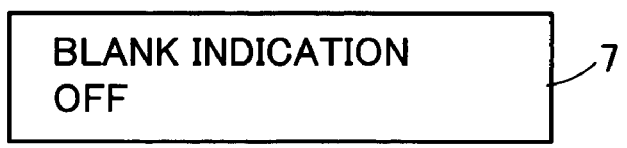
FIG. 11B is a diagram showing display contents of the liquid crystal display when setting without indicating blank of the print label P in the blank indication setting process.

At this time, when the image display setting key 111 is entered, as shown in FIG. 11B, the liquid crystal display 7 shows "BLANK INDICATION OFF", and the blank of the print label P is not indicated. When the image display setting key 111 is entered again, as shown in FIG. 11A, the liquid crystal display 7 shows "BLANK INDICATION ON", and the blank of the print label P is indicated. That is, at S112, at every input of image display setting key 111, the state of indicating the blank of the print label P and the state of not indicating are changed over alternately. At S112, when the return key 5 is entered, the state of indicating or not indicating the blank of the print label P is established, and the established content is stored in the RAM 72, and the process resumes the main control program in FIG. 5.

Figure 12:
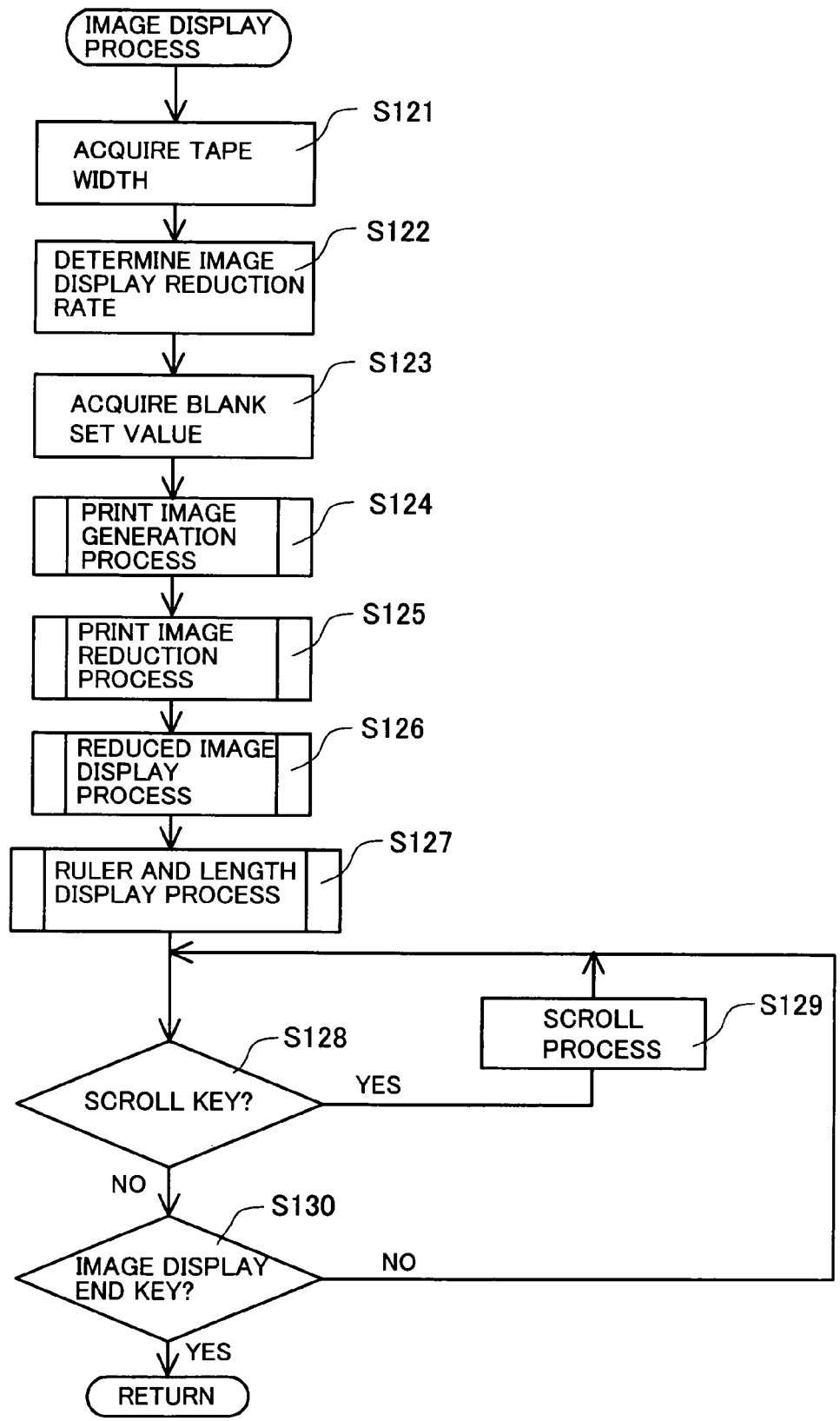
FIG. 12 is a flowchart of an image display process program.

Image display process at S21 in FIG. 5 is explained. FIG. 12 is a flowchart of an image display process program. As mentioned above, at S16 in FIG. 5, when it is judged that the image display key 112 is entered (Yes at S16), going to S21 in FIG. 5, the image display in FIG. 12 is processed. That is, at S121, first, the tape width of the print tape T is acquired. More specifically, as mentioned above, there are five types of tape width 24 mm, 18 mm, 12 mm, 9 mm, and 6 mm, and on the basis of the selective shielding by the photo couplers P1, P2, P3, by judging the combination of H signal and L signal issued from the tape width detector 13, the tape width of the print tape T is acquired. Going to S122, the reduction rate of the image display is determined on the basis of the acquired tape width.

At this time, the reduction rate of the image display is determined on the basis of the table shown in FIG. 13 stored in the ROM 71. The content of the table shown in FIG. 13 is explained. When the tape width is 24 mm, the actual print height on the print label P is 128 dots, and when the image display on the liquid crystal display 7 is displayed in the height of 40 dots, 31% is determined as the reduction rate of image display, and when the image display on the liquid crystal display 7 is displayed in the height of 20 dots, 16% is determined as the reduction rate of image display.

When the tape width is 18 mm, the actual print height on the print label P is 112 dots, and when the image display on the liquid crystal display 7 is displayed in the height of 40 dots, 36% is determined as the reduction rate of image display, and when the image display on the liquid crystal display 7 is displayed in the height of 20 dots, 18% is determined as the reduction rate of image display.

When the tape width is 12 mm, the actual print height on the print label P is 70 dots, and when the image display on the liquid crystal display 7 is displayed in the height of 40 dots, 57% is determined as the reduction rate of image display, and when the image display on the liquid crystal display 7 is displayed in the height of 20 dots, 29% is determined as the reduction rate of image display.

When the tape width is 9 mm, the actual print height on the print label P is 56 dots, and when the image display on the liquid crystal display 7 is displayed in the height of 40 dots, 71% is determined as the reduction rate of image display, and when the image display on the liquid crystal display 7 is displayed in the height of 20 dots, 36% is determined as the reduction rate of image display.

When the tape width is 6 mm, the actual print height on the print label P is 32 dots, and when the image display on the liquid crystal display 7 is displayed in the height of 40 dots, 125% is determined as the reduction rate of image display (that is, the display is magnified), and when the image display on the liquid crystal display 7 is displayed in the height of 20 dots, 63% is determined as the reduction rate of image display.

At S122 in FIG. 12, once the reduction rate of the image display is determined on the basis of the table shown in FIG. 13, going to S123, the set value of blank amount on the print label P is acquired. The blank amount on the print label P has been set at S101 for blank setting process in FIG. 8, and the value is stored in the RAM 72.

The operation is sequentially followed by print image generation process at S124, print image reduction process at S125, reduced image display process at S126, and ruler and length display process at S127. These processes are described later.

After the ruler and length display process at S127, going to S128, it is judged whether the scroll key 113 is entered or not. When the scroll key 113 is entered (Yes at S128), going to S129, the scroll is processed, and the process returns to S128. More specifically, in the scroll process, when the right scroll key 113 is entered, the range of the print label P displayed in image on the liquid crystal display 7 is shifted to the right side, and when the left scroll key 113 is entered, the range of the print label P displayed in image on the liquid crystal display 7 is shifted to the left side. On the other hand, when it is judged that the scroll key 113 is not entered (No at S128), going to S130, it is judged whether the image display end key 114 is entered or not. When the image display end key 114 is not entered (No at S130), the process returns to S128, and when it is judged that the image display end key 114 is entered (Yes at S130), the process resumes the main control program in FIG. 5.

Figure 14:
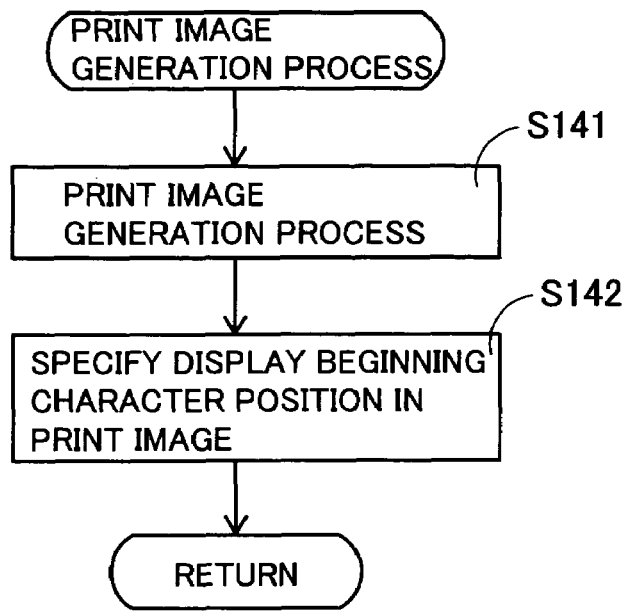
FIG. 14 is a flowchart of a print image generation process program.

Print image generation process at S124 in FIG. 12 is explained. FIG. 14 is a flowchart of a print image generation process program. As mentioned above, at S124 in FIG. 12, when the print image generation in FIG. 14 is processed, first, at S141, generation of print image is processed. At this time, in the RAM 72, the dot pattern data stored in the development buffer is transferred to the image display buffer. For the convenience of explanation, herein, the image data developed on the image display buffer is called "print image." At S142, the position of the character corresponding to the beginning data of dot pattern on the image display buffer is specified. More specifically, if the dot pattern on the image display buffer is ABC, the position of the character A is specified. Or if the dot pattern on the image display buffer is □ABC ("□" means a space), the position of the space □ is specified in the case of the state of including space data in the beginning data of the text (see S111 in FIG. 9), or the position of the character A is specified in the case of the state of not including space data in the beginning data of the text (see S111 in FIG. 9). At S142, when the position of the character corresponding to the beginning data is specified, the process resumes the image display process program in FIG. 12.

Figure 15:
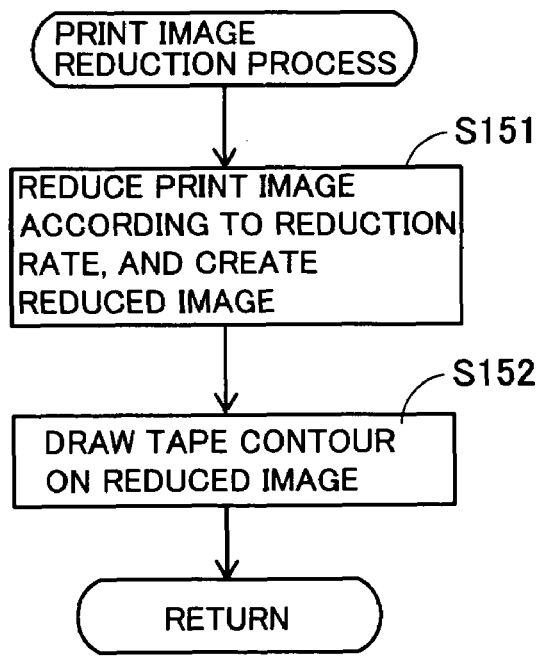
FIG. 15 is a flowchart of a print image reduction process program.

Print image reduction process at S125 in FIG. 12 is explained. FIG. 15 is a flowchart of a print image reduction process program. As mentioned above, at S125 in FIG. 12, when the print image reduction in FIG. 14 is processed, first, at S151, the print image is reduced according to the reduction rate, and a reduced image is created. At this time, the reduction rate is the percentage determined already at S122 in FIG. 12. In the RAM 72, the image data of the print image reduced at the specified reduction rate is transferred to the image display buffer. For the convenience of explanation, herein, the image data developed on the reduced image display buffer is called "reduced image." At S152, when the contour of the print label P is drawn in the reduced image display buffer, the process resumes the image display process program in FIG. 12.

Figure 16:
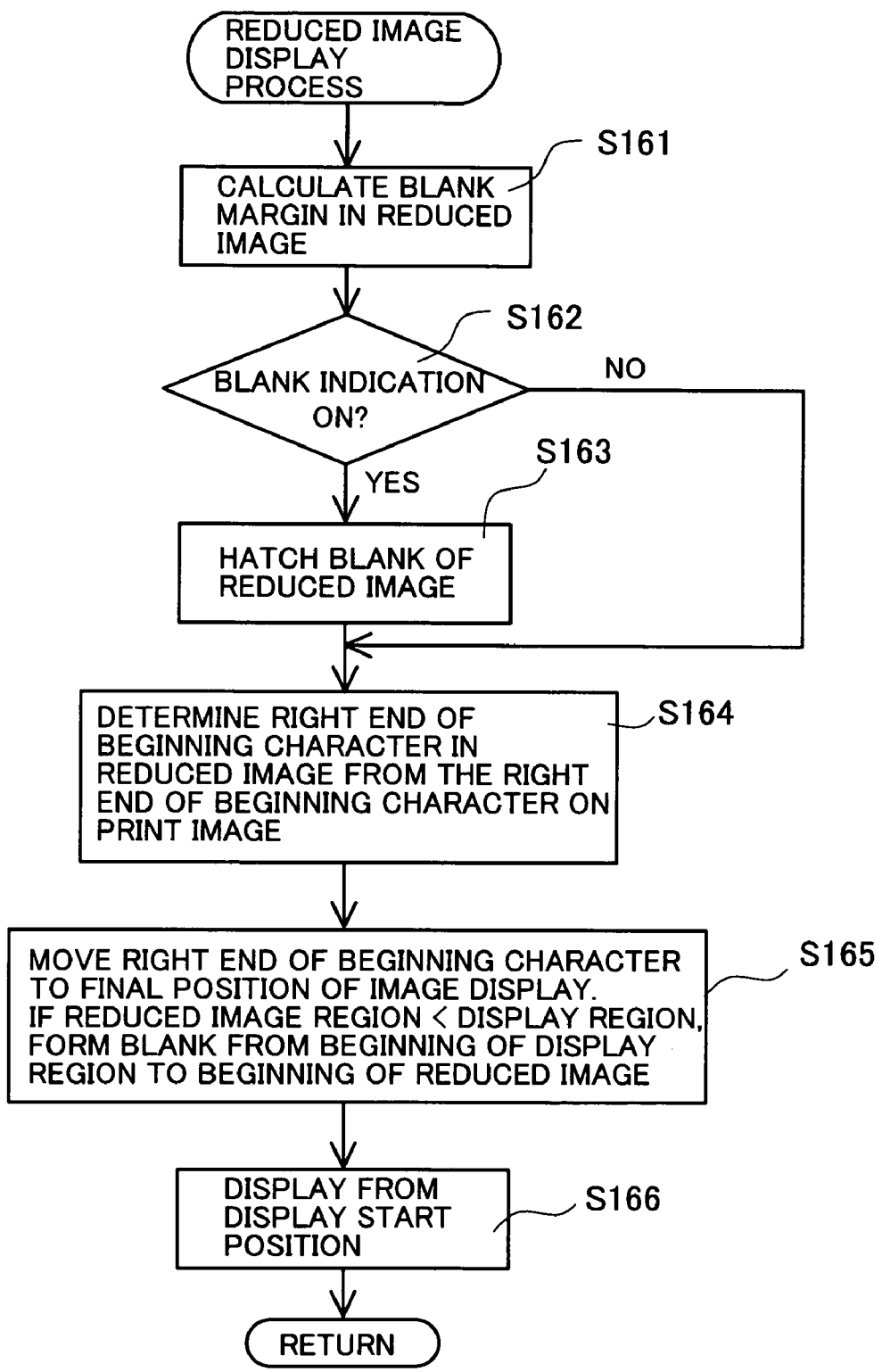
FIG. 16 is a flowchart of a reduced image display process program.

Reduced image display process at S126 in FIG. 12 is explained. FIG. 16 is a flowchart of a reduced image display process program. As mentioned above, at S126 in FIG. 12, when the reduced image display in FIG. 16 is processed, at S161, the blank amount of the print label P in the reduced image is calculated, and at S162, it is judged whether the blank of the print label P is indicated or not. In the state of indicating the blank of the print label P (Yes at S162), going to S163, the blank of the print label P in the reduced image is hatched, and the process goes to S164. In the state of not indicating the blank of the print label P (No at S162), the process goes to S164 without doing anything.

At S164, the right side position of the character corresponding to the beginning data in the image display buffer is specified, and is multiplied by the reduction rate, and the right side position of the character corresponding to the beginning data in the reduced image display buffer is determined. At S165, in the reduced image display buffer, the image data is moved so that the right side position of the character corresponding to the beginning data may coincide with the final position of the liquid crystal display 7, and, as a result, when the contour position corresponding to the leading end of the print label P is positioned right side of the beginning position of the liquid crystal display 7, it is judged that the extent from the beginning position of the liquid crystal display 7 to the contour position corresponding to the leading end of the print label P is a blank, and going to S166, the image is displayed on the liquid crystal display 7 on the basis of the reduced image display buffer.

Figure 17A:
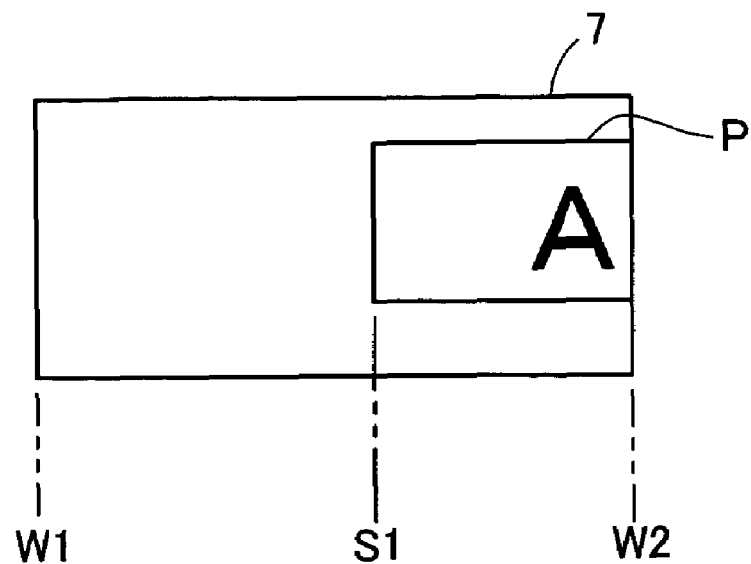
FIGS. 17A, B are diagrams showing examples of contents of image display on the liquid crystal display in a reduced image display process.
Figure 17B:
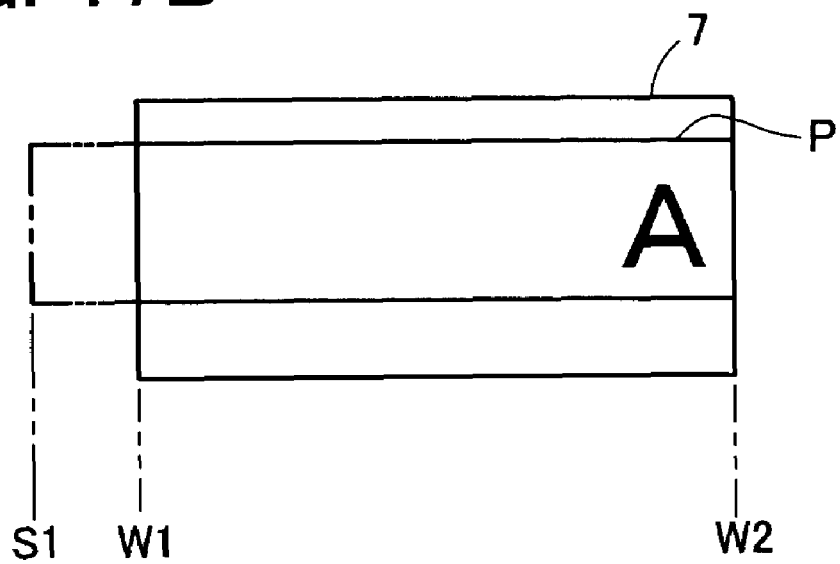

More specifically, if the dot pattern on the reduced image display buffer is ABC, the right side position of the character A corresponding to the beginning data is moved to the final position of the liquid crystal display 7. As a result, as shown in FIGS. 17A, B, with the right side position of the character A corresponding to the beginning data being moved to the final position W2 of the liquid crystal display 7, the image of the print label P is displayed. Further, as shown in FIG. 17A, at this time, when the contour position S1 corresponding to the leading end of the print label P is positioned right side of the beginning position W1 of the liquid crystal display 7, the extent from the beginning position W1 of the liquid crystal display 7 to the contour position S1 corresponding to the leading end of the print label P is judged to be a blank. On the other hand, as shown in FIG. 17B, when the contour position S1 corresponding to the leading end of the print label P is positioned left side of the beginning position W1 of the liquid crystal display 7, the image of the leading end portion of the print label P is displayed in the entire region in the width direction of the liquid crystal display 7, and processing of blank as in FIG. 17A is not executed.

Or if the dot pattern on the reduced image display buffer is □ABC ("□" means a space), the right side position of the space □ corresponding to the beginning data is moved to the final position of the liquid crystal display 7 in the case of the state of including space data in the beginning data of the text (see S111 in FIG. 9). Or the right side position of the character A corresponding to the beginning data is moved to the final position of the liquid crystal display 7 in the case of the state of not including space data in the beginning data of the text (see S111 in FIG. 9).

After S166, the process resumes the image display process program in FIG. 12.

Figure 18:
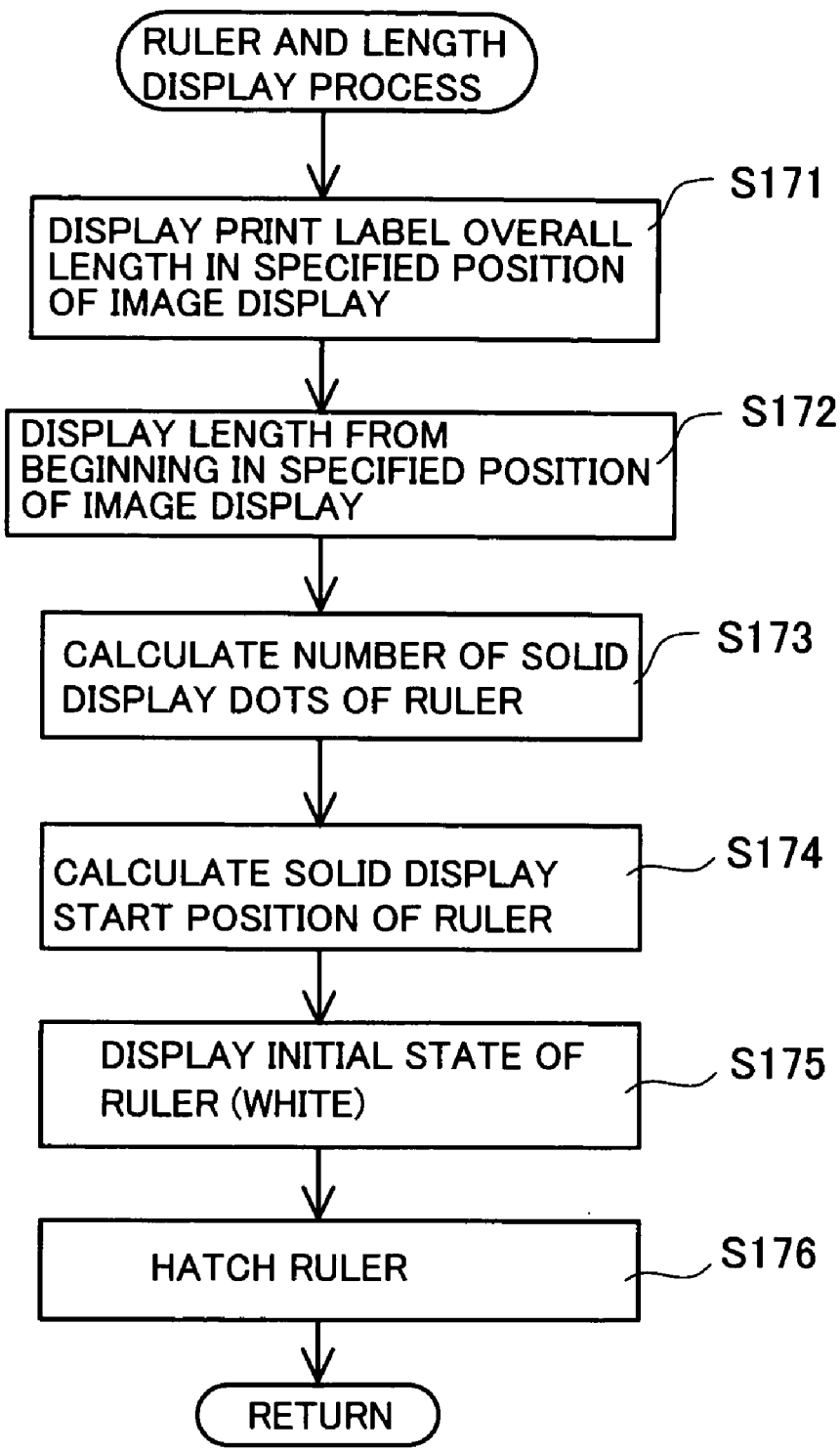
FIG. 18 is a flowchart of a ruler and length display process program.

Ruler and length display process at S127 in FIG. 12 is explained. FIG. 18 is a flowchart of a ruler and length display process program. As mentioned above, at S127 in FIG. 12, when the ruler and length display in FIG. 18 is processed, first, going to S171, in the image display on the liquid crystal display 7, as shown in FIG. 20, for example, overall length L2 of the print label P is displayed in a second display region 104 in the unit of millimeters. At this time, the overall length L2 of the print label P is the value already calculated in the print image generation process in FIG. 14 and the value is used. At S172, in the image display on the liquid crystal display 7, as shown in FIG. 20, for example, distance L1 from the leading end S1 of the print label P to the display start position S2 of the print label P is displayed in a first display region 103 in the unit of millimeters. Herein, the distance L1 from the leading end S1 of the print label P to the display start position S2 of the print label P is calculated on the basis of the position of the character corresponding to the beginning data specified at S142 of the print image generation process in FIG. 14.

At S173, as shown in FIG. 20, for example, the lateral width of solid display region 102 provided in lengthy ruler 101 is calculated by the number of dots.

More specifically, for example, when the overall length of the print label P in the print image is 500 dots, the distance from the initial position W1 of the liquid crystal display 7 in the reduced image to the final position W2 is 128 dots (see FIG. 17), and the lateral length of the lengthy ruler 101 is 40 dots, by the calculation formula of 128/500×40=10, as the lateral width of the solid display region 102 provided in the lengthy ruler 101, 10 dots is obtained.

At S174, as shown in FIG. 20, for example, the start position R1 of solid display region 102 provided in a lengthy ruler 101 is calculated by the number of dots.

More specifically, for example, when the overall length of the print label P in the print image is 500 dots, the distance from the initial position W1 of the liquid crystal display 7 in the reduced image to the final position W2 is 128 dots (see FIG. 17), the lateral length of the lengthy ruler 101 is 40 dots, and the distance from the contour position S1 corresponding to the leading end of the print label P in the reduced image to the initial position W1 of the liquid crystal display 7 is X dots, by the calculation formula of X×(128/500×40)/128, the start position R1 of the solid display region 102 is calculated by the number of dots.

At S175, in the image display on the liquid crystal display 7, for example, as shown in FIG. 20, the lengthy ruler 101 is displayed in a white initial state, and at S176, in the lengthy ruler 101, from the start position R1 to the right side, a portion of 10 dots is hatched, and the solid display region 102 is displayed.

After S176, the process resumes the image display process program in FIG. 12.

As described specifically above, in the tape printer 1 and its control method of the preferred embodiment, when the print key 3 is entered, as one of other processes at S17 in FIG. 5, print process is executed, and the text is printed on the print tape T according to the content stored in the print buffer saved in the RAM 72, and then the print tape T is cut off automatically by cooperation of the fixed blade 56 and movable blade 57, and one print label P is produced. At this time, as shown in FIG. 19 to FIG. 21, the image of the print label P can be displayed on the liquid crystal display 7 (S21 in FIG. 5).

At this time, in the image display on the liquid crystal display 7 (S21 in FIG. 5), for example, as shown in FIGS. 17A, B, the right position of the character A corresponding to the beginning data of the text is moved to the position corresponding to the final position W2 of the liquid crystal display 7, and in this state (S165 in FIG. 16), the image of the leading end portion of the print label P is displayed (S166 in FIG. 16).

Also, in the image display on the liquid crystal display 7 (S21 in FIG. 5), for example, as shown in FIG. 20, the lengthy ruler 101 corresponding to the overall contour of the print label P is provided, in the lengthy ruler 101, and by hatching the solid display region 102, the image display range of the print label P on the liquid crystal display 7 is displayed in a relative positional relation to the lengthy ruler 101 (S127 in FIG. 12).

Figure 21:
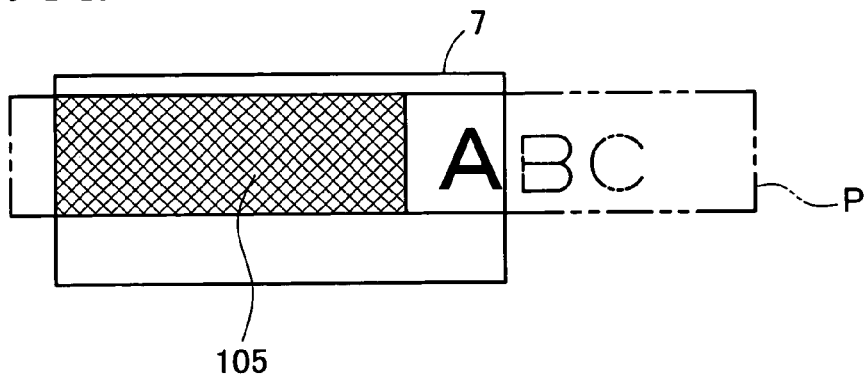
FIG. 21 is a conceptual diagram of a hatching display mode of blank of a print label of image display on liquid crystal display, showing an example of an initial display state of the image display of the print label on the liquid crystal display.

That is, in the tape printer 1 and its control method of the preferred embodiment, in the liquid crystal display 7, for example, as shown in FIGS. 17A, B, the right position of the character A corresponding to the beginning data of the text is moved to the position corresponding to the final position W2 of the liquid crystal display 7, and in this state (S165 in FIG. 16), the image of the leading end portion of the print label P is displayed (S166 in FIG. 16), and, for example, as shown in FIG. 19 to FIG. 21, if a large blank is set at the leading end of the printing label P, as initial display state, it is possible to avoid the incidence of image display of only the blank at the leading end of the printing label P. Therefore, in the initial display state in image display of the liquid crystal display 7, the character and the like corresponding to the beginning data of the text to be printed on the print label P (for example, the character A in FIG. 19 to FIG. 21) is always displayed, and the image display range of the print label P can be instantly known, and the image display is easy to understand for the user.

In this case, too, if the text is, for example, □ABC ("□" being a space), by setting so as not to include space data in the beginning data of the text to be printed on the print label P at S111 in FIG. 9, if multiple space data is entered at the beginning of the text to be printed on the print label P, as initial display state, it is possible to avoid the incidence of image display of only the blank and space at the leading end portion of the printing label P. Therefore, in the initial display state in image display of the liquid crystal display 7, the character and the like corresponding to the beginning data of the text to be printed on the print label P (for example, the character A in FIG. 19 to FIG. 21) is always displayed, and the image display range of the print label P can be instantly known, and the image display is easy to understand for the user.

Therefore, in the initial display state in image display of the liquid crystal display 7, the character and the like corresponding to the beginning data of the text to be printed on the print label P (for example, the character A in FIG. 19 to FIG. 21) is always displayed, and further at S112 in FIG. 9, by setting to indicate the blank positioned before and after the text to be printed on the print label P, for example, in FIG. 21, out of the forward blank positioned ahead of the text ABC, the image display portion 105 on the liquid crystal display 7 is displayed by hatching, and the blank can be clearly distinguished from the text, so that the image display is easy to understand for the user. This is the same when a space is present at the beginning of the text.

Further, in the tape printer 1 and its control method of the preferred embodiment, in the liquid crystal display 7 for displaying the image of the print label P, for example, as shown in FIG. 20, in the solid display region 102 of hatching display in the lengthy ruler 101, the image display range of the print label P on the liquid crystal display 7 can be displayed in a relative positional relation with the lengthy ruler 101 (S127 in FIG. 12). Therefore, even if only the blank or space of the print label P is displayed, through the solid display region 102 in the lengthy ruler 101, the image display range of the print label P can be instantly known, and the image display is easy to understand for the user.

Also, in the tape printer 1 and its control method of the preferred embodiment, in the liquid crystal display 7 for displaying the image of the print label P, for example, as shown in FIG. 20, the distance L1 from the leading end S1 of the print label P to the display start position S2 of the print label P is displayed in the first display region 103 in the unit of millimeters (S172 in FIG. 18), and the image display range of the print label P can be specifically known from the actual length of the distance from the leading end S1 of the print label P, so that the image display is easy to understand for the user.

In the tape printer 1 of the preferred embodiment, in the liquid crystal display 7 for displaying the image of the print label P, for example, as shown in FIG. 20, the distance L2 from the leading end S1 to the final end S3 of the print label P, that is, the overall length of the print label P, is displayed in the second display region 104 in the unit of millimeters (S171 in FIG. 18), and the actual length of the overall contour of the print label P can be specifically known, so that the image display is easy to understand for the user.

Still more, in the tape printer 1 and its control method of the preferred embodiment, in the liquid crystal display 7 for displaying the image of the print label P, for example, the image of the print label P is displayed (S126 in FIG. 12) at the reduction rate (S121, S122 in FIG. 12) determined on the basis of the tape width of the print tape T, and the display range of the print label P can be scrolled (S129 in FIG. 12), so that the image display is easy to understand for the user.

The invention is not limited to these illustrated embodiments alone, but may be changed and modified within a range not departing from its true spirit.

For example, in the tape printer 1 and its control method of the preferred embodiment, the text to be printed on the print label P is written horizontally, but it is similarly applicable to vertical writing.

Further, in the tape printer 1 and its control method of the preferred embodiment, in the image display of the liquid crystal display 7 (S21 in FIG. 5), for example, as shown in FIGS. 17A, B, the right position of the character A corresponding to the beginning data of the text is moved to the position corresponding to the final position W2 of the liquid crystal display 7, and in this state (S165 in FIG. 16), the image of the leading end portion of the print label P is displayed (S166 in FIG. 16), and further as shown in FIG. 20, the lengthy ruler 101 corresponding to the overall contour of the print label P is provided, and in this lengthy ruler 101, by the hatching solid display region 102, the image display range of the print label P on the liquid crystal display 7 is displayed in a relative positional relation with the lengthy ruler 101 (S127 in FIG. 12). In this respect, if only one of the two can be executed, its specific effect can be executed.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A tape printer comprising a text creating device that creates a text composed of document data including characters, a printing device that prints the text on a lengthy print tape in a state of having a forward blank positioned ahead of the text, a cutting device that cuts off the print tape having the text printed by the printing device in a state of having the forward blank and a backward blank positioned behind the text, thereby producing a print label, and an image display device that displays an image of the print label, the image display device having a first end position and a second end position, the first end position being a beginning position, the second end position being a final position, a direction from the final position to the beginning position corresponding to a feed direction of the print tape, the tape printer further comprising:

a control device that controls the tape printer, wherein the control device displays an image of a leading end portion of the print label on the image display device by disposing an image of beginning data of the text in the final position of the image display device.

2. The tape printer according to claim 1, wherein the control device sets whether or not to include space data in the beginning data of the text.

3. The tape printer according to claim 1, wherein the control device sets whether or not to indicate the forward blank by the image display device.

4. The tape printer according to claim 1, further comprises a tape width detecting device that detects a tape width of the print tape, wherein the control device determines a reduction rate on the basis of a detection result by the tape width detecting device, and displays the image of the print label at the reduction rate.

5. The tape printer according to claim 4, wherein the control device determines the reduction rate also on the basis of an image display size of the print label.

6. The tape printer according to claim 1, further comprising:

an instructing device that instructs a move of a display range of the print label in the image display device.

7. A tape printer comprising a text creating device that creates a text composed of document data including characters, a printing device that prints the text on a lengthy print tape in a state of having a forward blank positioned ahead of the text, a cutting device that cuts off the print tape having the text printed by the printing device in a state of having the forward blank and a backward blank positioned behind the text, thereby producing a print label, and an image display device that displays an image of the print label in a first part of the image display device, further comprising:

a control device that controls the tape printer; and a lengthy display region held in a second part of the image display device to represent an overall contour of the print label, wherein the control device displays a display range of the print label in the display region, the display range illustrating where a full portion of the print label that is displayed in the first part of the image display device is positioned in the overall contour, such that, when only a part of the print label is displayed in the first part of the image display device, a full length of the part of the print label is illustrated in the overall contour differently from a remaining part of the print label in the overall contour.

8. The tape printer according to claim 7, wherein the control device displays part of the print label on the image display device so that a display start position of the print label is at a predetermined distance from a leading end of the print label.

9. The tape printer according to claim 7, wherein the control device displays a distance of an overall length of the print label on the image display device.

10. The tape printer according to claim 7, further comprising:

a tape width detecting device that detects a tape width of the print tape, wherein the control device determines a reduction rate on the basis of a detection result by the tape width detecting device, and displays the image of the print label at the reduction rate.

11. The tape printer according to claim 10, wherein the control device determines the reduction rate also on the basis of an image display size of the print label.

12. The tape printer according to claim 7, further comprising:

an instructing device that instructs a move of the display range of the print label in the image display device.

13. A tape printer comprising a text creating device that creates a text composed of document data including characters arranged in a feed direction on a lengthy print tape, a printing device that prints the text on the lengthy print tape in a state of having a forward blank positioned ahead of the text, a cutting device that cuts off the print tape having the text printed by the printing device in a state of having the forward blank and a backward blank positioned behind the text, thereby producing a print label, and an image display device that displays an image of the print label in a first part of the image display device, the first part of the image display device having a first end position and a second end position, the first end position being a beginning position, the second end position being a final position, a direction from the final position to the beginning position corresponding to the feed direction, the tape printer further comprising:

a control device that controls the tape printer; and a lengthy display region held in a second part of the image display device to represent an overall contour of the print label, wherein the control device displays an image of a leading end portion of the print label on the image display device by disposing an image of beginning data of the text in the final position of the first part of the image display device, and the control device also displays a display range of the print label in the display region, the display range illustrating where a full portion of the print label that is displayed in the first part of the image display device is positioned in the overall contour, such that, when only a part of the print label is displayed in the first part of the image display device, a full length of the part of the print label is illustrated in the overall contour differently from a remaining part of the print label in the overall contour.

14. The tape printer according to claim 13, wherein the control device sets whether or not to include space data in the beginning data of the text.

15. The tape printer according to claim 13, wherein the control device sets whether or not to indicate the forward blank by the image display device.

16. The tape printer according to claim 13, wherein the control device displays part of the print label on the image display device so that a display start position of the print label is at a predetermined distance from a leading end of the print label.

17. The tape printer according to claim 13,
wherein the control device displays a distance of an overall length of the print label on the image display device.

18. The tape printer according to claim 13, further comprising:
a tape width detecting device that detects a tape width of the print tape,
wherein the control device determines a reduction rate on the basis of a detection result by the tape width detecting device, and displays the image of the print label at the reduction rate.

19. The tape printer according to claim 18,
wherein the control device determines the reduction rate also on the basis of an image display size of the print label.

20. The tape printer according to claim 13, further comprising:
an instructing device that instructs a move of the display range of the print label in the image display device.

21. A control method of a tape printer comprising a text creating step of creating a text composed of document data including characters, a printing step of printing the text on a lengthy print tape in a state of having a forward blank positioned ahead of the text, a cutting step of cutting off the print tape having the text printed at the printing step in a state of having the forward blank and a backward blank positioned behind the text, thereby producing a print label, and an image display step of displaying an image of the print label on an image display means, the image display means having a first end position and a second end position, the first end position being a beginning position, the second end position being a final position, a direction from the final position to the beginning position corresponding to a feed direction of the print tape, the tape printer further comprising:
a first display control step of displaying an image of a leading end portion of the print label on the image display means by disposing an image of beginning data of the text in the final position of the image display means.

22. A control method of a tape printer comprising a text creating step of creating a text composed of document data including characters, a printing step of printing the text on a lengthy print tape in a state of having a forward blank positioned ahead of the text, a cutting step of cutting off the print tape having the text printed at the printing step in a state of having the forward blank and a backward blank positioned behind the text, thereby producing a print label, and an image display step of displaying an image of the print label on a first part of an image display means, further comprising:
a display control step of displaying a display range of the print label in an overall contour of the print label in a lengthy display region held in a second part of the image display means, the display range illustrating where a full portion of the print label that is displayed in the first part of the image display means is positioned in the overall contour, such that, when only a part of the print label is displayed in the first part of the image display means, a full length of the part of the print label is illustrated in the overall contour differently from a remaining part of the print label in the overall contour.

23. A control method of a tape printer comprising a text creating step of creating a text composed of document data including characters arranged in a feed direction on a lengthy print tape, a printing step of printing the text on the lengthy print tape in a state of having a forward blank positioned ahead of the text, a cutting step of cutting off the print tape having the text printed at the printing step in a state of having the forward blank and a backward blank positioned behind the text, thereby producing a print label, and an image display step of displaying an image of the print label on an image display means in a first part of the image display means, the first part of the image display means having a first end position and a second end position, the first end position being a beginning position, the second end position being a final position, a direction from the final position to the beginning position corresponding to the feed direction, the tape printer, further comprising:
a first display control step of displaying an image of a leading end portion of the print label on the image display means by disposing an image of beginning data of the text in the final position of the first part of the image display means; and
a second display control step of displaying a display range of the print label in an overall contour of the print label in a lengthy display region held in a second part of the image display means, the display range illustrating where a full portion of the print label that is displayed in the first part of the image display means is positioned in the overall contour, such that, when only a part of the print label is displayed in the first part of the image display means, a full length of the part of the print label is illustrated in the overall contour differently from a remaining part of the print label in the overall contour.

24. A tape printer comprising text creating means for creating a text composed of document data including characters, printing means for printing the text on a lengthy print tape in a state of having a forward blank positioned ahead of the text, cutting means for cutting off the print tape having the text printed by the printing means in a state of having the forward blank and a backward blank positioned behind the text, thereby producing a print label, and image display means for displaying an image of the print label, the image display means having a first end position and a second end position, the first end position being a beginning position, the second end position being a final position, a direction from the final position to the beginning position corresponding to a feed direction of the print tape, the tape printer further comprising:
first display control means for displaying an image of a leading end portion of the print label on the image display means by disposing an image of beginning data of the text in the final position of the image display means.

25. The tape printer according to claim 24, further comprising:
first setting means for setting whether or not to include space data in the beginning data of the text.

26. The tape printer according to claim 24, further comprising:
setting means for setting whether or not to indicate the forward blank by the image display means.

27. The tape printer according to claim 24, further comprising:
tape width detecting means for detecting a tape width of the print tape,
wherein the first display control means determines a reduction rate on the basis of a detection result by the tape width detecting means, and displays the image of the print label at the reduction rate.

28. The tape printer according to claim 27,
wherein the first display control means determines the reduction rate also on the basis of an image display size of the print label.

29. The tape printer according to claim 24, further comprising:
instructing means for instructing a move of a display range of the print label in the image display means.

30. A tape printer comprising text creating means for creating a text composed of document data including characters, printing means for printing the text on a lengthy print tape in a state of having a forward blank positioned ahead of the text, cutting means for cutting off the print tape having the text printed by the printing means in a state of having the forward blank and a backward blank positioned behind the text, thereby producing a print label, and image display means for displaying an image of the print label in a first part of the image display means, further comprising:
a lengthy display region held in a second part of the image display means to represent an overall contour of the print label; and
display control means for displaying a display range of the print label in the display region, the display range illustrating where a full portion of the print label that is displayed in the first part of the image display means is positioned in the overall contour, such that, when only a part of the print label is displayed in the first part in the image display means, a full length of the part of the print label is illustrated in the overall contour differently from a remaining part of the print label in the overall contour.

31. The tape printer according to claim 30,
wherein the display control means displays part of the print label on the image display means so that a display start position of the print label is at a predetermined distance from a leading end of the print label.

32. The tape printer according to claim 30,
wherein the display control means displays a distance of an overall length of the print label on the image display means.

33. The tape printer according to claim 30, further comprising:
tape width detecting means for detecting a tape width of the print tape,
wherein the display control means determines a reduction rate on the basis of a detection result by the tape width detecting means, and displays the image of the print label at the reduction rate.

34. The tape printer according to claim 33,
wherein the display control means determines the reduction rate also on the basis of an image display size of the print label.

35. The tape printer according to claim 30, further comprising:
instructing means for instructing a move of the display range of the print label in the image display means.

36. A tape printer comprising text creating means for creating a text composed of document data including characters arranged in a feed direction on a lengthy print tape, printing means for printing the text on the lengthy print tape in a state of having a forward blank positioned ahead of the text, cutting means for cutting off the print tape having the text printed by the printing means in a state of having the forward blank and a backward blank positioned behind the text, thereby producing a print label, and image display means for displaying an image of the print label in a first part of the image display means, the first part of the image display means having a first end position and a second end position, the first end position being a beginning position, the second end position being a final position, a direction from the final position to the beginning position corresponding to the feed direction, the tape printer further comprising:
first display control means for displaying an image of a leading end portion of the print label on the image display means by disposing an image of beginning data of the text in the final position of the first part of the image display means;
a lengthy display region held in a second part of the image display means to represent an overall contour of the print label; and
second display control means for displaying a display range of the print label in the display region, the display range illustrating where a full portion of the print label that is displayed in the first part of the image display means is positioned in the overall contour, such that, when only a part of the print label is displayed in the first part of the image display means, a full length of the part of the print label is illustrated in the overall contour differently from a remaining part of the print label in the overall contour.

37. The tape printer according to claim 36, further comprising:
first setting means for setting whether or not to include space data in the beginning data of the text.

38. The tape printer according to claim 36, further comprising:
setting means for setting whether or not to indicate the forward blank by the image display means.

39. The tape printer according to claim 36,
wherein the second display control means displays part of the print label on the image display means so that a display start position of the print label is at a predetermined distance from a leading end of the print label.

40. The tape printer according to claim 36,
wherein the second display control means displays a distance of an overall length of the print label on the image display means.

41. The tape printer according to claim 36, further comprising:
tape width detecting means for detecting a tape width of the print tape,
wherein the second display control means determines a reduction rate on the basis of a detection result by the tape width detecting means, and displays the image of the print label at the reduction rate.

42. The tape printer according to claim 41,
wherein the second display control means determines the reduction rate also on the basis of an image display size of the print label.

43. The tape printer according to claim 36, further comprising:
instructing means for instructing a move of the display range of the print label in the image display means.

* * * * *